US008012353B2

(12) United States Patent  (10) Patent No.: US 8,012,353 B2
Schechter et al.  (45) Date of Patent: Sep. 6, 2011

(54) METHOD AND APPARATUS FOR SIMULTANEOUS CLARIFICATION AND ENDOGENOUS POST DENITIFRICATION

(75) Inventors: Ronen Itzhak Schechter, Tivon (IL); Nir Assulin, Hibat Zion (IL)

(73) Assignee: Aqwise-Wise Water Technologies, Herzilia (IL)

( * ) Notice: Subject to any disclaimer, the term of this patent is extended or adjusted under 35 U.S.C. 154(b) by 113 days.

(21) Appl. No.: 12/309,376

(22) PCT Filed: Aug. 9, 2007

(86) PCT No.: PCT/IL2007/000997
§ 371 (c)(1),
(2), (4) Date: Apr. 9, 2009

(87) PCT Pub. No.: WO2008/018077
PCT Pub. Date: Feb. 14, 2008

(65) Prior Publication Data
US 2009/0211972 A1  Aug. 27, 2009

Related U.S. Application Data

(60) Provisional application No. 60/822,115, filed on Aug. 11, 2006.

(51) Int. Cl.
*C02F 3/30* (2006.01)
(52) U.S. Cl. ......... 210/617; 210/630; 210/150; 210/903
(58) Field of Classification Search .................. 210/615, 210/617, 618, 630, 150, 151, 903
See application file for complete search history.

(56) References Cited

U.S. PATENT DOCUMENTS

| 4,159,945 | A | | 7/1979 | Savage |
| 4,279,753 | A | | 7/1981 | Nielson et al. |
| 4,322,296 | A | | 3/1982 | Fan et al. |
| 4,561,974 | A | * | 12/1985 | Bernard et al. ............... 210/151 |
| 4,620,929 | A | | 11/1986 | Hofmann |
| 5,490,934 | A | | 2/1996 | Schmid |
| 5,908,555 | A | * | 6/1999 | Reinsel et al. ................ 210/617 |
| 6,110,389 | A | | 8/2000 | Horowitz |
| 6,565,750 | B2 | | 5/2003 | Nasr |
| 6,616,845 | B2 | | 9/2003 | Shechter et al. |
| 6,682,653 | B2 | * | 1/2004 | Chuang et al. ................ 210/151 |
| 6,726,838 | B2 | | 4/2004 | Shechter et al. |
| 7,022,233 | B2 | * | 4/2006 | Chen ............................ 210/151 |
| 7,135,110 | B2 | | 11/2006 | McGrath |
| 2006/0186027 | A1 | | 8/2006 | Geneys et al. |

OTHER PUBLICATIONS

International Search Report related to PCT/IL2007/000997.

* cited by examiner

*Primary Examiner* — Christopher Upton
(74) *Attorney, Agent, or Firm* — Husch Blackwell LLP

(57) ABSTRACT

A method for treatment of nitrified wastewater, the method including supplying wastewater to be treated to a tank having a layer of biomass supporting media near or at the top thereof, retaining biomass on and below the biomass supporting media for a sufficient time such that the biomass hydrolyses and supplies organic carbon to the wastewater in the tank; denitrifying and simultaneously clarifying the wastewater by providing an upward flow of the wastewater in the tank through the layer of biomass supporting media and discharging excess sludge from the bottom of the tank at a rate which is selected to maintain nitrate and ammonia concentrations below selected thresholds.

17 Claims, 5 Drawing Sheets

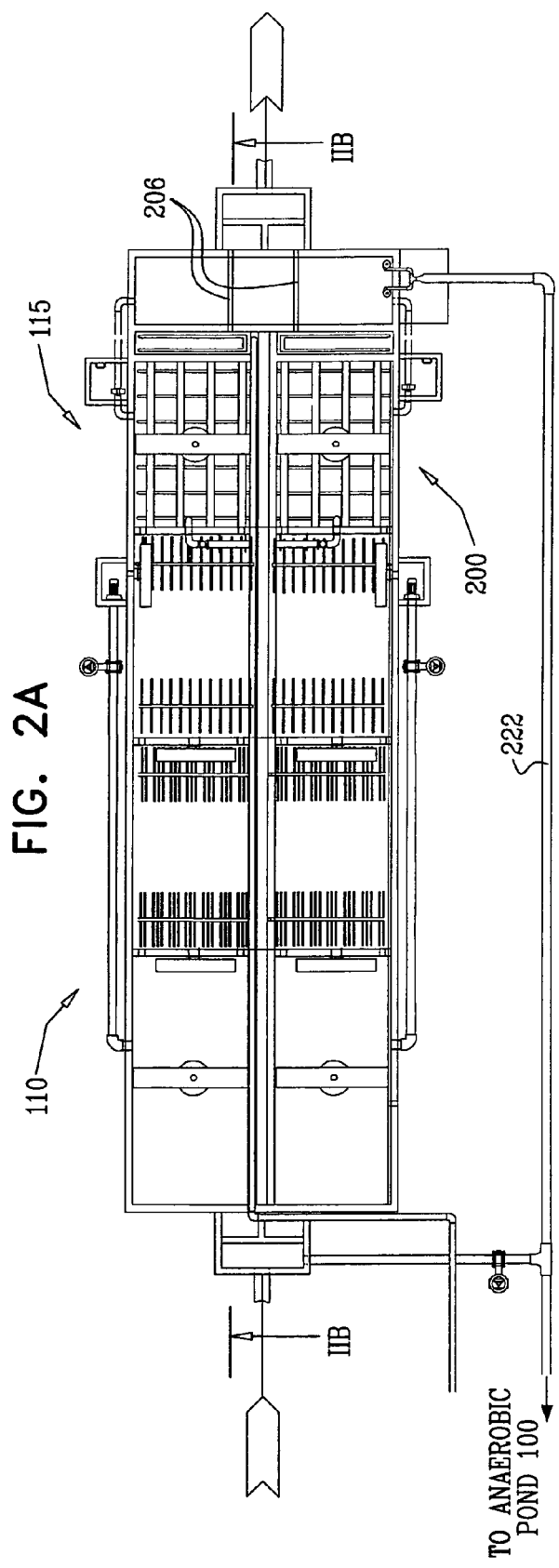
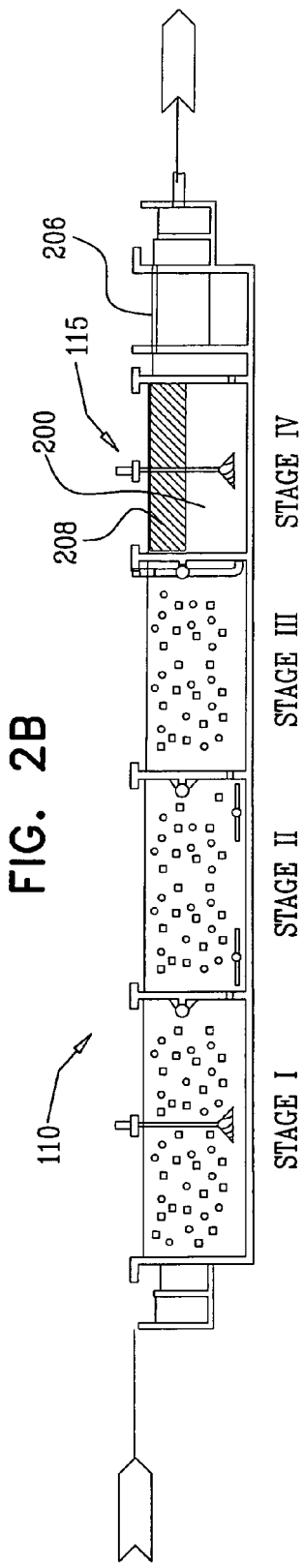

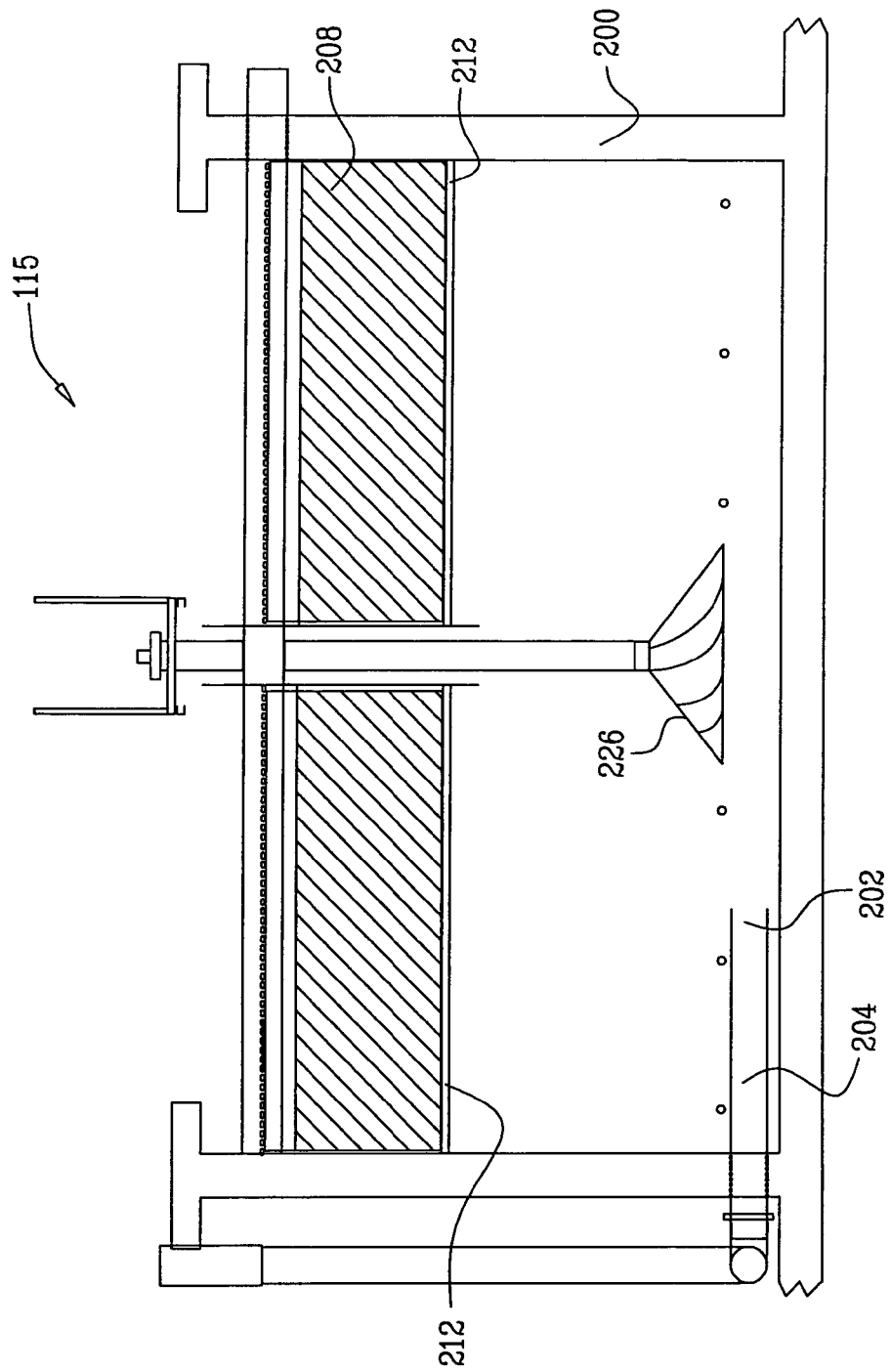

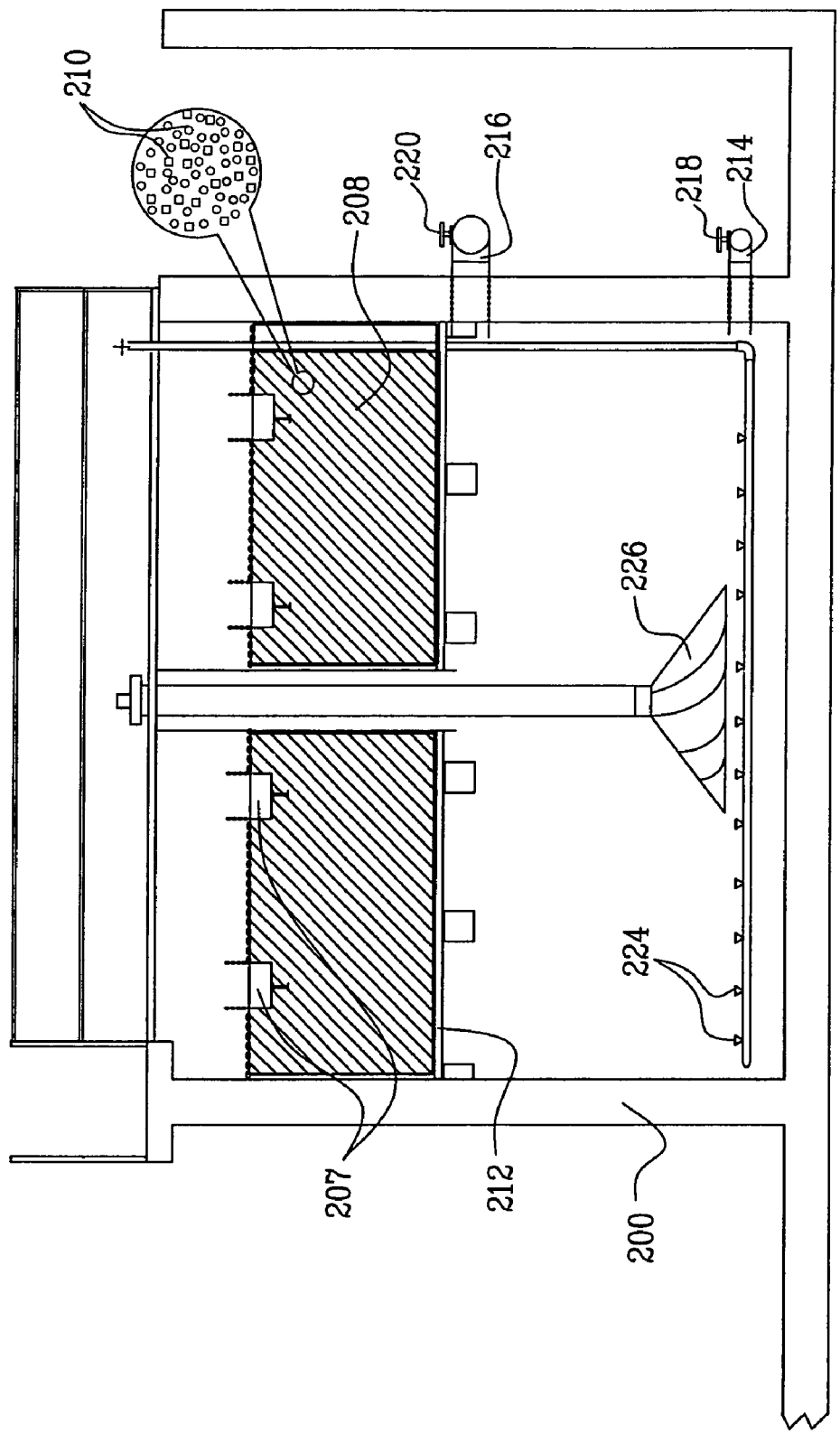

METHOD AND APPARATUS FOR SIMULTANEOUS CLARIFICATION AND ENDOGENOUS POST DENITIFRICATION

REFERENCE TO RELATED APPLICATIONS

Reference is hereby made to U.S. Provisional Patent Application 60/822,115, filed Aug. 11, 2006 and entitled SIMULTANEOUS CLARIFICATION AND ENDOGENOUS POST DENITRIFICATION BY UP-FLOW THROUGH A LAYER OF FLOATING MEDIA, the disclosure of which is hereby incorporated by reference and priority of which is hereby claimed pursuant to 37 CFR 1.78(a)(4) and (5)(i).

FIELD OF THE INVENTION

The present invention relates to wastewater treatment generally and more particularly to wastewater treatment systems and methodologies including denitrification functionality.

BACKGROUND OF THE INVENTION

The following patent publications, the disclosures of which are hereby incorporated by reference, are believed to represent the current state of the art:
U.S. Pat. Nos. 4,159,945; 5,490,934; 6,616,845; 6,726,838; 7,135,110; and
U.S. Published Patent Application 2006/0186027A1.

SUMMARY OF THE INVENTION

The present invention seeks to provide an improved system and methodology for wastewater treatment.

There is thus provided in accordance with a preferred embodiment of the present invention a method for treatment of nitrified wastewater, the method including supplying wastewater to be treated to a tank having a layer of biomass supporting media near or at the top thereof, retaining biomass on and below the biomass supporting media for a sufficient time such that the biomass hydrolyses and supplies organic carbon to the wastewater in the tank, denitrifying and simultaneously clarifying the wastewater by providing an upward flow of the wastewater in the tank through the layer of biomass supporting media and discharging excess sludge from the bottom of the tank at a rate which is selected to maintain nitrate and ammonia concentrations below selected thresholds.

Preferably, the media is periodically drained of water in order to prevent accumulation of biomass therein and consequent plugging of openings and voids therein.

Preferably, the method for treatment of nitrified wastewater also includes treating the wastewater in a media based biological water treatment system prior to supplying it to the tank having a layer of biomass supporting media. Additionally or alternatively, the method for treatment of nitrified wastewater also includes subsequent to the denitrifying and simultaneously clarifying the wastewater, utilizing the water without subsequent clarification.

Preferably, the denitrifying and simultaneously clarifying the wastewater is produced by an upward flow of nitrate-containing wastewater through the biomass which is retained by the biomass supporting media which causes suspended solids to be accumulated in and below the biomass supporting media. Additionally, the biomass is retained in the tank by the biomass supporting media for a duration sufficient for endogenous decay of the biomass to take place, whereby the biomass hydrolyses, thus releasing organic carbon into the water. Preferably, the biomass acts in a synergetic manner to clarify the effluent sufficiently to obviate the need for downstream clarification thereof prior to utilization. Additionally or alternatively, the duration includes 20-50 days.

Preferably, the tank includes an existing secondary clarifier tank of a wastewater treatment plant.

Preferably, the method for treatment of nitrified wastewater also includes evenly dispersing biomass sludge in the tank and bringing it in contact with the wastewater that flows therethrough.

Preferably, the layer of biomass supporting media includes a multiplicity of biomass carriers. Alternatively, the layer of biomass supporting media includes at least one of blocks of structure media, inclined plates and inclined tube bundles.

There is also provided in accordance with another preferred embodiment of the present invention a system for treatment of nitrified wastewater, the system including a tank having a layer of biomass supporting media retained near or at the top thereof and operative to retain biomass on and below the biomass supporting media for a sufficient time such that the biomass hydrolyses and supplies organic carbon to the wastewater in the tank, an inlet near the bottom of the tank for receiving the wastewater and a wastewater flow driver providing an upward flow of the wastewater in the tank through the layer of biomass supporting media, thereby denitrifying and simultaneously clarifying the wastewater.

Preferably, the system for treatment of nitrified wastewater also includes a sludge outlet operative to discharge excess sludge from the bottom of the tank at a rate which is selected to maintain nitrate and ammonia concentrations below selected thresholds. Additionally or alternatively, the system for treatment of nitrified wastewater also includes a media based biological water treatment system operative to treat the wastewater upstream of the tank having a layer of biomass supporting media.

Preferably, the level of clarification of the wastewater in the tank is sufficient to obviate the need for subsequent clarification prior to utilization.

Preferably, the upward flow of the wastewater through the biomass which is retained in the water by the biomass supporting media causes suspended solids to be accumulated in and below the biomass supporting media. Additionally, the biomass is retained in the tank by the biomass supporting media for a duration sufficient for endogenous decay of the biomass to take place, whereby the biomass hydrolyses, thus releasing organic carbon into the water. Preferably, the biomass acts in a synergetic manner to clarify the effluent sufficiently to obviate the need for downstream clarification thereof prior to utilization. Additionally or alternatively, the duration includes 20-50 days.

Preferably, the tank includes an existing secondary clarifier tank of a wastewater treatment plant. Additionally or alternatively, the tank also includes a mechanical agitator operative to evenly disperse biomass sludge in the tank and bring it in contact with the wastewater that flows therethrough.

Preferably, the layer of biomass supporting media includes a multiplicity of biomass carriers. Alternatively or additionally, the layer of biomass supporting media includes at least one of blocks of structure media, inclined plates and inclined tube bundles.

BRIEF DESCRIPTION OF THE DRAWINGS

The present invention will be understood and appreciated more fully from the following detailed description, taken in conjunction with the drawings in which:

FIGS. 2A and 2B are simplified top view and sectional illustrations of a preferred embodiment of part of the system of FIG. 1, with FIG. 2B being taken along lines IIB-IIB in FIG. 2A;

FIGS. 4A and 4B are simplified sectional illustrations taken along lines IVA-IVA and IVB-IVB in FIG. 3.

DETAILED DESCRIPTION OF A PREFERRED EMBODIMENT

Figure 1:
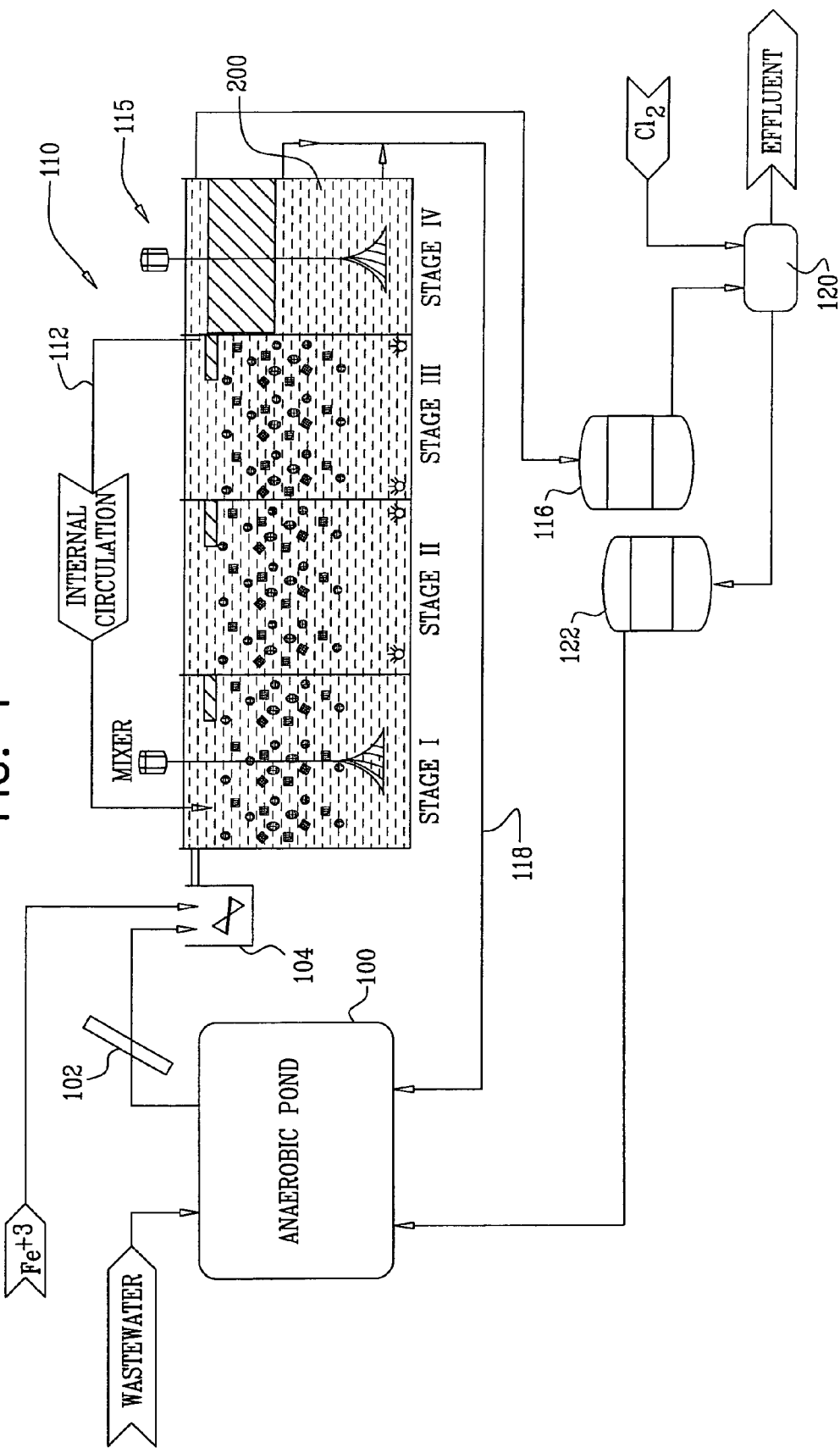
FIG. 1 is a simplified illustration of a wastewater treatment system constructed and operative in accordance with a preferred embodiment of the present invention.

Reference is now made to FIG. 1, which is a simplified illustration of a wastewater treatment system constructed and operative in accordance with a preferred embodiment of the present invention.

Wastewater, such as municipal wastewater, is preferably supplied to an anaerobic pond 100 for flow equalization and suspended solids precipitation, and, following settlement of some solids therefrom, is optionally and preferably supplied, preferably via a screen 102, to a sulfide precipitation tank 104, which also receives a supply of $Fe^{+3}$ ions, preferably in the form of an aqueous solution. Downstream of sulfide precipitation tank 104, the wastewater is supplied to a multistage media based wastewater treatment subsystem 110, typically including four stages, here identified as stages I, II, III and IV. A preferred embodiment of the multistage wastewater treatment subsystem is illustrated in FIGS. 2A and 2B.

Stage I is preferably an anoxic pre-denitrification stage, while stages II and III are aerobic stages. Internal circulation is preferably provided from stage III back to stage I, as indicated at reference numeral 112. Circulation of activated sludge is preferably avoided in water treatment subsystem 110.

Stages I, II and III of the multistage wastewater treatment subsystem 110 are preferably of the type described in applicant/assignee's U.S. Pat. No. 6,616,845, the disclosure of which is hereby incorporated by reference, which employs biomass carriers, preferably of the type described in applicant/assignee's U.S. Pat. No. 6,726,838, the disclosure of which is hereby incorporated by reference.

Partially treated wastewater from stage III of multistage wastewater treatment subsystem 110 is supplied to a denitrification and clarification stage 115, which preferably forms stage IV of multistage wastewater treatment subsystem 110. The denitrification and clarification stage 115 produces denitrified and clarified water which may be utilized following further mechanical filtration in a filtration stage 116. It is a particular feature of the present invention that secondary clarification downstream of the denitrification and clarification stage 115 is not usually necessary and may be obviated. Sludge from the denitrification and clarification stage 115 is preferably supplied to the anaerobic pond 100, as indicated by reference numeral 118. Alternatively, the sludge may be treated by any other conventional sludge treatment process.

Downstream of filtration stage 116, the denitrified and clarified water is supplied to a final treatment stage 120, at which chlorine treatment may be applied for disinfecting according to local regulations.

Water from final treatment stage 120 is used to periodically backwash part or all of the filters, as indicated at reference numeral 122, from solids accumulated therein. The backwash water from the filters is discharged into pond 100 for the purpose of solids precipitation and stabilization.

It is a particular feature of the present invention that there is provided, preferably by the apparatus described hereinabove, and more particularly by the denitrification and clarification stage 115, treatment of nitrified wastewater, including:

supplying wastewater to be treated to a tank having a layer of biomass supporting media near or at the top thereof;

retaining biomass on and below the biomass supporting media for a sufficient time such that the biomass hydrolyses and supplies organic carbon to the wastewater in the tank;

denitrifying and simultaneously clarifying the wastewater by providing an upward flow of the wastewater in the tank through the layer of biomass supporting media; and discharging excess sludge from the bottom of the tank at a rate which is selected to maintain nitrate and ammonia concentrations below selected thresholds.

Figure 3:
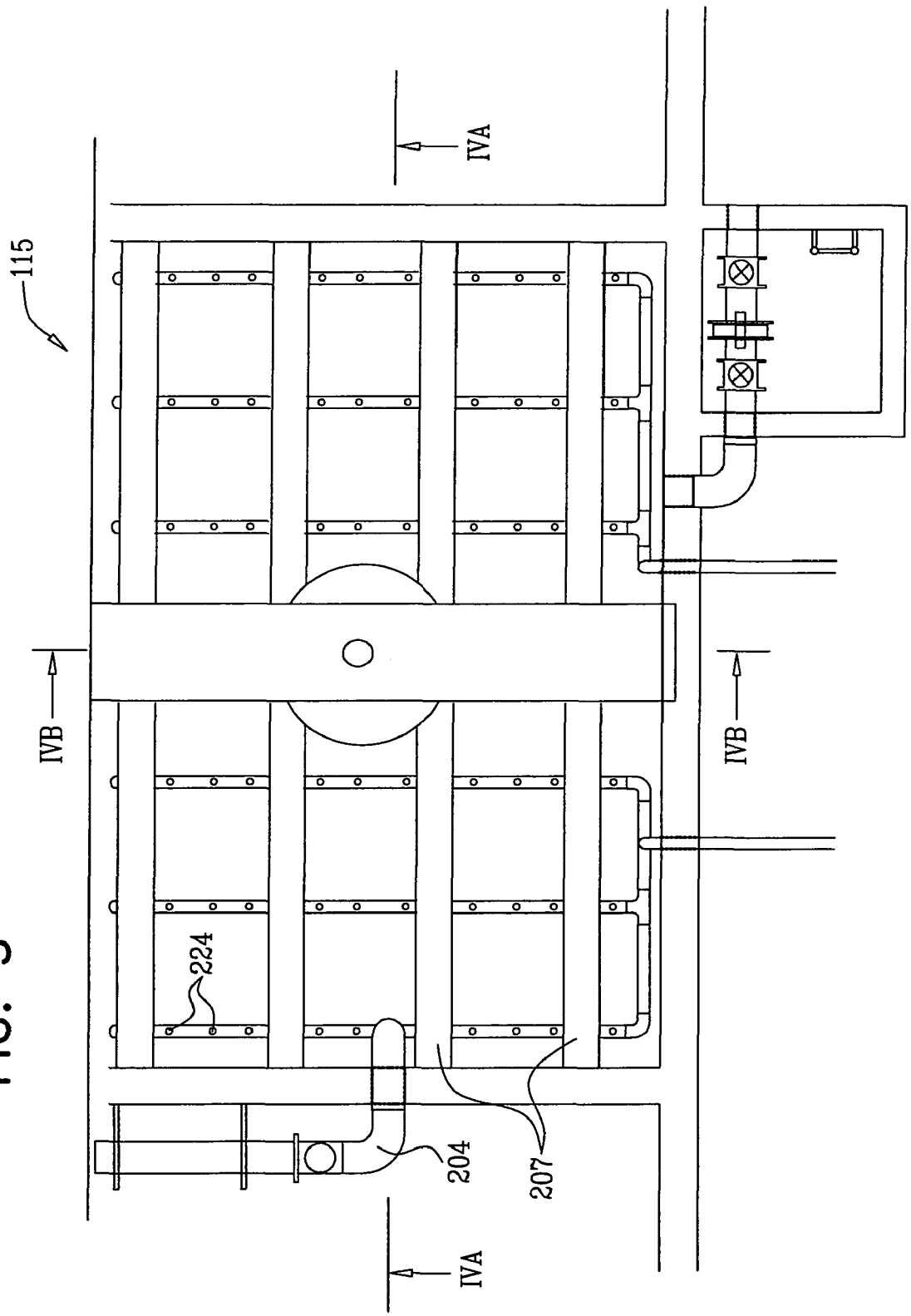
FIG. 3 is a simplified detailed top view illustration of a denitrification and clarification stage of the system of FIGS. 1-2B.

This and additional particular features of the present invention are explained in the discussion which follows and thereafter with additional reference to FIGS. 3, 4A and 4B, which illustrate a preferred embodiment of denitrification functionality.

Wastewater treatment of the type contemplated by the present invention includes three phases:

1. Oxidation of organic carbon to $CO_2$
2. Oxidation of ammonium and ammonium compounds to nitrates which are highly soluble in water; and
3. Conversion of nitrates to $N_2$ gas.

Phases 1 and 2 take place in Stages I, II and III of multistage wastewater treatment subsystem 110 (FIGS. 1, 2A and 2B). Phase 3 takes place in stage IV, the denitrification and clarification stage 115 (FIGS. 1, 2A and 2B).

In the prior art, phase 3 is followed by a clarification phase. In the present invention, the clarification phase is preferably obviated.

It is known in the prior art that biological denitrification requires biomass, nitrate and organic carbon. The organic carbon is required in order to provide biological oxygen demand. A difficulty encountered in the prior art is that organic carbon is not available along with nitrate, since the organic carbon tends to be oxidized. An oversupply of organic carbon, which could theoretically overcome this difficulty, results in the biomass reacting with the organic carbon rather than with the ammonium, thus interfering with the production of nitrate.

Accordingly, the prior art attempts to overcome this difficulty by recycling the nitrate produced at the end of the process, such as at stage III of the multistage wastewater treatment subsystem, to the beginning of the process, such as at stage I of the multistage wastewater treatment subsystem. Typically such recirculation, to be effective must be at a rate of about 800% of the throughput of the wastewater treatment system and involves unacceptably high energy costs. Further, such an architecture places an unacceptably high lower limit to the level of nitrates at the end of the process.

An alternative proposed in the prior art is to add carbon at the end of the process from an external source. This may be prohibitively expensive and would also increase the quantity of biomass produced in the process that would need to be treated downstream, which is undesirable.

The present invention overcomes the difficulties and limitations of the prior art by employing the biomass in a highly synergetic manner which results in the required carbon being supplied by biological action of the biomass on the water circulating therethrough and clarification of the water being effected by the circulation of the water up through the biomass.

As is described in greater detail hereinbelow with particular reference to FIGS. 3, 4A and 4B, the denitrification and clarification stage 115 is constructed and operative such that an upward flow of nitrate-containing wastewater passes through a biomass which is retained in the water by biomass carrier media at the top of a tank. A relatively high level of suspended solids is accumulated in and below the biomass.

The biomass is retained in the tank for a sufficient duration such that endogenous decay of the biomass takes place. Thus, the biomass dies and hydrolyses, releasing organic carbon into the water. Retention of the biomass for the sufficient duration, preferably 20-50 days in average, depending on water temperature, is enabled by the presence of the biomass carrier media at the top of the tank. The presence of the relatively large biomass also acts in a synergetic manner to clarify the effluent sufficiently as to obviate the need for downstream clarification in many applications.

Turning now additionally to FIGS. 3, 4A and 4B, it is seen that the denitrification and clarification stage 115 comprises a tank 200, which may be similar or identical to the tanks employed in stages I, II and III of multistage wastewater treatment subsystem 110 (FIGS. 1, 2A and 2B). Tank 200 preferably comprises a partially-treated, nitrate-rich wastewater inlet 202 communicating with the interior of tank 200 adjacent the bottom thereof and supplying partially-treated, nitrate-rich, wastewater received from stage III of subsystem 110 (FIGS. 1, 2A and 2B) via a conduit 204. The nitrified wastewater received at inlet 202 normally contains some biomass in the form of suspended solids. Preferably, denitrified, clarified wastewater from the denitrification and clarification stage 115 is outlet by overflow at the top part of tank 200 into a conduit 206 which supplies the denitrified, clarified wastewater to final treatment stage 120 (FIG. 1). Preferably the overflow regions are defined by weirs 207, which are distributed about the top surface of tank 200.

In another preferred embodiment of the present invention, tank 200 of denitrification and clarification stage 115 may be an existing secondary clarifier tank of a wastewater treatment plant.

A layer 208 of media, preferably a randomly packed multiplicity of biomass carriers 210 is supported, as by a screen 212, near the top of the tank. The biomass carriers 210 are preferably biomass carriers of the type described in applicant/assignee's U.S. Pat. No. 6,726,838, the disclosure of which is hereby incorporated by reference, but alternatively may be any other suitable biomass carriers. Preferred structural characteristics of the biomass carriers include:

Specific surface area: 50-900 square meters/cubic meters and more preferably 200-850 square meters/cubic meters Void volume: 50%-90% and more preferably 75%-90%

Overall size: 5 millimeters-85 millimeters and more preferably 14 millimeters-40 millimeters Density: 0.92-0.98

Minimum opening: 2-5 millimeters

Maximum opening 3-70 millimeters and more preferably 4-10 millimeters.

The vertical thickness of layer 208 is preferably greater than 50 centimeters and most preferably between 80-100 centimeters.

The biomass carriers 210 may be packed in baskets or cages. Alternatively, instead of a multiplicity of biomass carriers, blocks of structure media, such as inclined plates, inclined tube bundles and more complex structures may be employed.

At least one and preferably two sludge outlets 214 and 216 are provided, outlet 214 adjacent the bottom of the tank 200 and outlet 216 just below screen 212. The sludge outlets are coupled via respective valves 218 and 220 to a sludge removal conduit 222 which supplies the sludge preferably to anaerobic pond 100.

Bubble diffusers 224, coupled to a source of pressurized air (not shown) are preferably distributed along the bottom of the interior of tank 200 and a mixer, 226, such as a motor driven rotary mixer, is disposed just above bubble diffusers 224. The combined action of bubble diffusers 224 and mixer 226 is to provide a generally uniform upward flow of the nitrified wastewater received at inlet 202, through a high concentration of sludge lying below layer 208 and through the layer 208 of media. Alternatively, a distributed inlet may replace inlet 202 and in such a case mixer 226 may be obviated. In the course of this upward flow most of the suspended solids in the nitrified wastewater received at inlet 202 accumulate and remain in the tank, so that the quantity of solids in tank 200 increases over time and the concentration of suspended solids in the denitrified wastewater supplied to final treatment stage 120 (FIG. 1) is correspondingly reduced. The layer 208 of media advantageously retains scum and rising sludge that is generated in simultaneous solids separation and biological denitrification.

Preferably the upward flow velocity of the liquid in tank 200 is between 1.0 and 2.5 meters per hour and most preferably between 1.5 and 2.0 meters per hour.

Sludge, or water having a high concentration of solids, is discharged through outlet 214 continuously or periodically at a rate which is sufficiently low to maintain endogenous denitrification in the tank 200 and high enough to prevent the level of ammonia in the denitrified and clarified outlet water from exceeding a predetermined level, according to local regulations. This discharge is governed by valve 218, which may be automatically controlled based on real time analysis of the level of ammonia in the denitrified and clarified outlet water.

Sludge, or water having a high concentration of solids, is discharged through outlet 216 periodically in an amount just sufficient to drain the layer 208 of media. The frequency of draining is selected to prevent the level of suspended solids in the denitrified and clarified outlet water from exceeding a predetermined level, preferably 20-30 mg/l, but possibly as low as 10 mg/l on average. Typically, this discharge takes place once or twice a day. This discharge is governed by valve 220, which may be automatically controlled by a timer or based on real time analysis of turbidity or other indicators of the level of suspended solids in the denitrified and clarified outlet water. Draining of layer 208 is intended to prevent clogging of the water passages in the carriers 210. Alternatively or additionally, an air dispersion system (not shown) may be provided below layer 208 for periodic cleaning of the layer 208 of media.

It will be appreciated by persons skilled in the art that the present invention is not limited to what has been particularly shown and described hereinabove. Rather, the scope of the invention includes both combinations and sub-combinations of various features described hereinabove as well as modifications and variations thereof which would occur to a person skilled in the art upon reading the foregoing description and which are not in the prior art.

The invention claimed is:
1. A method for treatment of nitrified wastewater, the method comprising:
supplying wastewater to be treated to a tank having a layer of biomass supporting media near or at the top thereof, said layer of biomass supporting media comprising a multiplicity of biomass carriers;

retaining biomass on and below said biomass supporting media for a sufficient time such that said biomass hydrolyses and supplies organic carbon to said wastewater in said tank; and denitrifying and simultaneously clarifying said wastewater by providing an upward flow of said wastewater in said tank through said layer of biomass supporting media, thereby causing mutual movement and realignment of said multiplicity of biomass carriers and causing suspended solids to be accumulated in and below said biomass supporting media.

2. A method for treatment of nitrified wastewater according to claim 1, wherein the media is periodically drained of water in order to prevent accumulation of biomass therein and consequent plugging of openings and voids therein.

3. A method for treatment of nitrified wastewater according to claim 1 and also comprising treating said wastewater in a media based biological water treatment system prior to supplying it to said tank having a layer of biomass supporting media.

4. A method for treatment of nitrified wastewater according to claim 1 and also comprising:
subsequent to said denitrifying and simultaneously clarifying said wastewater, utilizing said water without subsequent clarification.

5. A method for treatment of nitrified wastewater according to claim 1 and wherein said biomass is retained in said tank by said biomass supporting media for a duration sufficient for endogenous decay of said biomass to take place, whereby said biomass hydrolyses, thus releasing organic carbon into the water.

6. A method for treatment of nitrified wastewater according to claim 5 and wherein said biomass acts in a synergetic manner to clarify the effluent sufficiently to obviate the need for downstream clarification thereof prior to utilization.

7. A method for treatment of nitrified wastewater according to claim 5 and wherein said duration comprises 20-50 days.

8. A method for treatment of nitrified wastewater according to claim 1 and wherein said tank comprises an existing secondary clarifier tank of a wastewater treatment plant.

9. A method for treatment of nitrified wastewater according to claim 1 and also comprising evenly dispersing biomass sludge in said tank and bringing it in contact with the wastewater that flows therethrough.

10. A system for treatment of nitrified wastewater, the system comprising:

a tank having a layer of biomass supporting media retained near or at the top thereof, said layer of biomass supporting media comprising a multiplicity of biomass carriers, and operative to retain biomass on and below said biomass supporting media for a sufficient time such that said biomass hydrolyses and supplies organic carbon to said wastewater in said tank;

an inlet near the bottom of the tank for receiving said wastewater; and a wastewater flow driver providing an upward flow of said wastewater in said tank through said layer of biomass supporting media, which causes mutual movement and realignment of said multiplicity of biomass carriers and causes suspended solids to be accumulated in and below said biomass supporting media, thereby denitrifying and simultaneously clarifying said wastewater.

11. A system for treatment of nitrified wastewater according to claim 10 and also comprising a sludge outlet operative to discharge excess sludge from the bottom of said tank at a rate which is selected to maintain nitrate and ammonia concentrations below selected thresholds.

12. A system for treatment of nitrified wastewater according to claim 10 and also comprising a media based biological water treatment system operative to treat said wastewater upstream of said tank having a layer of biomass supporting media.

13. A system for treatment of nitrified wastewater according to claim 10 and also comprising a controller for controlling the level of clarification of said wastewater in said tank to be sufficient to obviate the need for subsequent clarification prior to utilization.

14. A system for treatment of nitrified wastewater according to claim 10 and wherein said biomass supporting media supports said biomass in said tank for a duration sufficient for endogenous decay of said biomass to take place, whereby said biomass hydrolyses, thus releasing organic carbon into the water.

15. A system for treatment of nitrified wastewater according to claim 14 and wherein said duration is 20-50 days.

16. A system for treatment of nitrified wastewater according to claim 10 and wherein said tank comprises an existing secondary clarifier tank of a wastewater treatment plant.

17. A system for treatment of nitrified wastewater according to claim 10 and wherein said tank also comprises a mechanical agitator operative to evenly disperse biomass sludge in said tank and bring it in contact with the wastewater that flows therethrough.

* * * * *